US009856371B2

(12) United States Patent
Kim et al.

(10) Patent No.: US 9,856,371 B2
(45) Date of Patent: Jan. 2, 2018

(54) THERMOPLASTIC RESIN COMPOSITION AND LOW-GLOSS MOLDED ARTICLE MADE THEREFROM

(71) Applicant: Samsung SDI Co., Ltd., Yongin-si (KR)

(72) Inventors: Bo Eun Kim, Uiwang-si (KR); Joo Hyun Jang, Uiwang-si (KR); Jae Won Heo, Uiwang-si (KR); Kwang Soo Park, Uiwang-si (KR); Yu Jin Jung, Uiwang-si (KR); Young Sub Jin, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 14/747,176

(22) Filed: Jun. 23, 2015

(65) Prior Publication Data
US 2015/0376386 A1 Dec. 31, 2015

(30) Foreign Application Priority Data

Jun. 27, 2014 (KR) .......... 10-2014-0079844
Oct. 17, 2014 (KR) .......... 10-2014-0140473

(51) Int. Cl.
*C08L 25/12* (2006.01)
*C08L 51/04* (2006.01)

(52) U.S. Cl.
CPC ......... C08L 25/12 (2013.01); *C08L 2205/025* (2013.01); *C08L 2205/03* (2013.01)

(58) Field of Classification Search
CPC ............... C08L 25/12; C08L 2205/025; C08L 2205/05; C08L 51/085
See application file for complete search history.

(56) References Cited

U.S. PATENT DOCUMENTS

| | | | |
|---|---|---|---|
| 3,322,853 A | 5/1967 | Trementozzi et al. | |
| 3,742,092 A | 6/1973 | Duke et al. | |
| 3,839,513 A | 10/1974 | Patel | |
| 3,898,300 A | 8/1975 | Hillard | |
| 4,027,073 A | 5/1977 | Clark | |
| 4,045,514 A | 8/1977 | Iwahashi et al. | |
| 4,062,909 A | 12/1977 | Morgan et al. | |
| 4,102,853 A | 7/1978 | Kawamura et al. | |
| 4,117,041 A | 9/1978 | Guschl | |
| 4,287,315 A | 9/1981 | Meyer et al. | |
| 4,303,772 A | 12/1981 | Novicky | |
| 4,391,935 A | 7/1983 | Bialous et al. | |
| 4,400,333 A | 8/1983 | Neefe | |
| 4,460,742 A | 7/1984 | Kishida et al. | |
| 4,466,912 A | 8/1984 | Phillips et al. | |
| 4,632,946 A | 12/1986 | Muench et al. | |
| 4,634,734 A | 1/1987 | Hambrecht et al. | |
| 4,652,614 A | 3/1987 | Eichenauer et al. | |
| 4,659,790 A | 4/1987 | Shimozato et al. | |
| 4,668,737 A | 5/1987 | Eichenauer et al. | |
| 4,692,488 A | 9/1987 | Kress et al. | |
| 4,745,029 A | 5/1988 | Kambour | |
| 4,757,109 A | 7/1988 | Kishida et al. | |
| 4,883,835 A | 11/1989 | Buysch et al. | |
| 4,906,696 A | 3/1990 | Fischer et al. | |
| 4,914,144 A | 4/1990 | Muehlbach et al. | |
| 4,918,159 A | 4/1990 | Nakamura et al. | |
| 4,983,658 A | 1/1991 | Kress et al. | |
| 4,988,748 A | 1/1991 | Fuhr et al. | |
| 4,997,883 A | 3/1991 | Fischer et al. | |
| 5,025,066 A | 6/1991 | Derudder et al. | |
| 5,061,558 A | 10/1991 | Fischer et al. | |
| 5,061,745 A | 10/1991 | Wittmann et al. | |
| 5,091,470 A | 2/1992 | Wolsink et al. | |
| 5,200,492 A | 4/1993 | Ohnaga et al. | |
| 5,204,394 A | 4/1993 | Gosens et al. | |
| 5,206,404 A | 4/1993 | Gunkel et al. | |
| 5,218,030 A | 6/1993 | Katayose et al. | |
| 5,219,907 A | 6/1993 | Niessner et al. | |
| 5,229,443 A | 7/1993 | Wroczynski | |
| 5,237,004 A | 8/1993 | Wu et al. | |
| 5,239,001 A | 8/1993 | Fischer et al. | |
| 5,274,031 A * | 12/1993 | Eichenauer ............ | C08L 51/04 525/64 |
| 5,280,070 A | 1/1994 | Drzewinski et al. | |
| 5,284,916 A | 2/1994 | Drzewinski | |
| 5,292,809 A | 3/1994 | Drzewinski et al. | |
| 5,306,778 A | 4/1994 | Ishida et al. | |

(Continued)

FOREIGN PATENT DOCUMENTS

| | | |
|---|---|---|
| CA | 1 121 535 | 4/1982 |
| CN | 1377913 A | 11/2002 |

(Continued)

OTHER PUBLICATIONS

Office Action in commonly owned U.S. Appl. No. 14/747,207, dated Aug. 2, 2016, pp. 1-17.
Search Report in commonly owned European Patent Application No. EP 01 27 4302 dated Mar. 4, 2005, pp. 1-4.
Office Action in commonly owned U.S. Appl. No. 11/768,592 dated Apr. 8, 2009, pp. 1-9.
Notice of Allowance in commonly owned U.S. Appl. No. 11/647,101 dated Dec. 29, 2008, pp. 1-7.
International Search Report in commonly owned International Application No. PCT/KR2006/005752, dated Mar. 27, 2007, pp. 1-2.

(Continued)

*Primary Examiner* — Jeffrey Mullis
(74) *Attorney, Agent, or Firm* — Additon, Higgins & Pendleton, P.A.

(57) ABSTRACT

A thermoplastic resin composition includes (A) a graft rubber copolymer, (B) an aromatic vinyl-vinyl cyanide-based copolymer, and (C) a silicone-modified aromatic vinyl-vinyl cyanide-based copolymer. The silicone-modified aromatic vinyl-vinyl cyanide-based copolymer (C) has an average particle size of about 100 μm or less.

12 Claims, 2 Drawing Sheets

(56) References Cited

U.S. PATENT DOCUMENTS

| | | |
|---|---|---|
| 5,354,796 A | 10/1994 | Creecy et al. |
| 5,412,036 A | 5/1995 | Traugott et al. |
| 5,446,103 A | 8/1995 | Traugott et al. |
| 5,449,557 A | 9/1995 | Liebler et al. |
| 5,451,650 A | 9/1995 | Siol et al. |
| 5,473,019 A | 12/1995 | Siol et al. |
| 5,475,053 A | 12/1995 | Niessner et al. |
| 5,574,099 A | 11/1996 | Nora et al. |
| 5,605,962 A | 2/1997 | Suzuki et al. |
| 5,627,228 A | 5/1997 | Kobayashi |
| 5,635,565 A | 6/1997 | Miyajima et al. |
| 5,643,981 A | 7/1997 | Yang et al. |
| 5,672,645 A | 9/1997 | Eckel et al. |
| 5,731,390 A | 3/1998 | van Helmond et al. |
| 5,750,602 A | 5/1998 | Kohler et al. |
| 5,833,886 A | 11/1998 | Dashevsky et al. |
| 5,905,122 A | 5/1999 | Ohtsuka et al. |
| 5,955,184 A | 9/1999 | Honda et al. |
| 6,022,917 A | 2/2000 | Kobayashi |
| 6,063,889 A | 5/2000 | Friebe et al. |
| 6,083,428 A | 7/2000 | Ueda et al. |
| 6,111,024 A | 8/2000 | McKee et al. |
| 6,127,465 A | 10/2000 | Nodera |
| 6,174,945 B1 | 1/2001 | Kim et al. |
| 6,252,002 B1 | 6/2001 | Yamada et al. |
| 6,337,371 B2 | 1/2002 | Kurata et al. |
| 6,369,141 B1 | 4/2002 | Ishii et al. |
| 6,380,304 B1 | 4/2002 | Vanspeybroeck et al. |
| 6,423,767 B1 | 7/2002 | Weber et al. |
| 6,437,029 B1 | 8/2002 | Lim et al. |
| 6,528,559 B1 | 3/2003 | Nakacho et al. |
| 6,528,561 B1 | 3/2003 | Zobel et al. |
| 6,566,428 B1 | 5/2003 | Ecket et al. |
| 6,576,161 B2 | 6/2003 | Lim et al. |
| 6,595,825 B1 | 7/2003 | De Wilde |
| 6,596,794 B1 | 7/2003 | Ecket et al. |
| 6,596,893 B2 | 7/2003 | Nakacho et al. |
| 6,613,822 B1 | 9/2003 | Eckel et al. |
| 6,613,824 B2 | 9/2003 | Campbell et al. |
| 6,630,524 B1 | 10/2003 | Lim et al. |
| 6,646,068 B2 | 11/2003 | Chisholm et al. |
| 6,686,404 B1 | 2/2004 | Eckel et al. |
| 6,716,900 B2 | 4/2004 | Jang et al. |
| 6,762,228 B2 | 7/2004 | Seidel et al. |
| 6,849,689 B2 | 2/2005 | Yamada et al. |
| 6,890,979 B2 | 5/2005 | Eichenauer et al. |
| 6,914,089 B2 | 7/2005 | Eckel et al. |
| 6,956,072 B1 | 10/2005 | Kanaka et al. |
| 7,001,944 B2 | 2/2006 | Vathauer et al. |
| 7,067,188 B1 | 6/2006 | Yang et al. |
| 7,094,818 B2 | 8/2006 | Lim et al. |
| 7,294,659 B2 | 11/2007 | Yatake |
| 7,511,088 B2 | 3/2009 | Lim et al. |
| 7,550,523 B2 | 6/2009 | Lim et al. |
| 7,659,332 B2 | 2/2010 | Kang et al. |
| 7,732,515 B2 | 6/2010 | Jang et al. |
| 7,767,738 B2 | 8/2010 | Gaggar et al. |
| 7,956,127 B2 | 6/2011 | Lee et al. |
| 8,119,726 B2 | 2/2012 | Lim et al. |
| 8,304,494 B2 | 11/2012 | Park et al. |
| 8,557,912 B2 | 10/2013 | Chung et al. |
| 8,735,490 B2 | 5/2014 | Chung et al. |
| 9,090,767 B2 | 7/2015 | Park et al. |
| 9,365,671 B2 | 6/2016 | Kim et al. |
| 2001/0009946 A1 | 7/2001 | Catsman et al. |
| 2002/0042483 A1 | 4/2002 | Vanderbilt |
| 2002/0115759 A1 | 8/2002 | Eckel et al. |
| 2002/0115794 A1 | 8/2002 | Singh et al. |
| 2002/0151624 A1 | 10/2002 | Kobayashi |
| 2003/0139504 A1 | 7/2003 | Miebach et al. |
| 2004/0013882 A1 | 1/2004 | Gorny et al. |
| 2004/0097648 A1* | 5/2004 | Nakai .............. C08F 265/04 525/63 |
| 2004/0122139 A1 | 6/2004 | Yang et al. |
| 2004/0192814 A1 | 9/2004 | Yang et al. |
| 2004/0198877 A1 | 10/2004 | Yang et al. |
| 2004/0249027 A1 | 12/2004 | Lim et al. |
| 2004/0249070 A1 | 12/2004 | Lim et al. |
| 2005/0159533 A1 | 7/2005 | Nabeshima et al. |
| 2005/0245648 A1 | 11/2005 | Lim et al. |
| 2005/0253277 A1 | 11/2005 | Yamanaka et al. |
| 2006/0004154 A1 | 1/2006 | DeRudder et al. |
| 2006/0014863 A1 | 1/2006 | Lim et al. |
| 2006/0030647 A1 | 2/2006 | Ebeling et al. |
| 2006/0074148 A1 | 4/2006 | Ahn et al. |
| 2006/0100307 A1 | 5/2006 | Uerz et al. |
| 2007/0055017 A1 | 3/2007 | Schultes et al. |
| 2007/0100073 A1 | 5/2007 | Lee et al. |
| 2007/0155873 A1 | 7/2007 | Kang et al. |
| 2007/0249767 A1 | 10/2007 | Kang et al. |
| 2007/0249768 A1 | 10/2007 | Hong et al. |
| 2007/0287799 A1 | 12/2007 | Ha et al. |
| 2007/0295946 A1 | 12/2007 | Lim et al. |
| 2008/0182926 A1 | 7/2008 | Lim et al. |
| 2009/0054568 A1 | 2/2009 | Uejima et al. |
| 2009/0080079 A1 | 3/2009 | Kogure et al. |
| 2009/0093583 A1 | 4/2009 | Kawato et al. |
| 2009/0118402 A1 | 5/2009 | Jang et al. |
| 2010/0029855 A1 | 2/2010 | Matsuoka et al. |
| 2010/0152357 A1 | 6/2010 | Kwon et al. |
| 2010/0168272 A1 | 7/2010 | Park et al. |
| 2010/0168315 A1 | 7/2010 | Park et al. |
| 2010/0168354 A1 | 7/2010 | Hong et al. |
| 2010/0240831 A1 | 9/2010 | Kim et al. |
| 2010/0256288 A1 | 10/2010 | Kim et al. |
| 2011/0003918 A1 | 1/2011 | Eckel et al. |
| 2011/0009524 A1 | 1/2011 | Kwon et al. |
| 2011/0021677 A1 | 1/2011 | Kwon et al. |
| 2011/0040019 A1 | 2/2011 | Kwon et al. |
| 2011/0157866 A1 | 6/2011 | Li et al. |
| 2011/0159293 A1 | 6/2011 | Park et al. |
| 2011/0160377 A1 | 6/2011 | Chung et al. |
| 2011/0160380 A1 | 6/2011 | Kwon et al. |
| 2011/0230610 A1 | 9/2011 | Schultes et al. |
| 2012/0016068 A1 | 1/2012 | Chung et al. |
| 2013/0328149 A1* | 12/2013 | Okaniwa .............. H01L 31/055 257/432 |
| 2014/0187717 A1 | 7/2014 | Kwon et al. |
| 2014/0275366 A1 | 9/2014 | Chrino et al. |
| 2015/0152205 A1 | 6/2015 | Kim et al. |
| 2015/0216787 A1 | 8/2015 | Hori et al. |
| 2015/0376315 A1 | 12/2015 | Jang et al. |
| 2015/0376392 A1 | 12/2015 | Kim et al. |
| 2015/0376403 A1 | 12/2015 | Kwon et al. |

FOREIGN PATENT DOCUMENTS

| | | |
|---|---|---|
| CN | 101061179 A | 10/2007 |
| CN | 101768331 A | 7/2010 |
| CN | 102115564 A | 7/2011 |
| CN | 102153848 A | 8/2011 |
| CN | 102329462 A | 1/2012 |
| CN | 102974324 A | 3/2013 |
| CN | 104072659 A | 10/2014 |
| DE | 19614845 A1 | 10/1997 |
| DE | 196 32 675 A1 | 2/1998 |
| DE | 19801198 A1 | 7/1999 |
| DE | 10061081 A1 | 6/2002 |
| EP | 0107015 A1 | 5/1984 |
| EP | 0149813 | 7/1985 |
| EP | 0370344 A2 | 5/1990 |
| EP | 0 449 689 A1 | 10/1991 |
| EP | 0483717 A2 | 5/1992 |
| EP | 0 612 806 A1 | 8/1994 |
| EP | 0640655 A3 | 3/1995 |
| EP | 0 661 342 A1 | 7/1995 |
| EP | 0 700 968 A1 | 3/1996 |
| EP | 0721962 A2 | 7/1996 |
| EP | 0 728 811 A2 | 8/1996 |
| EP | 0 767 204 A2 | 4/1997 |
| EP | 0771852 A2 | 5/1997 |
| EP | 0 795 570 A1 | 9/1997 |
| EP | 0909790 A1 | 4/1999 |
| EP | 0 970 997 A2 | 1/2000 |

(56) References Cited

FOREIGN PATENT DOCUMENTS

| | | |
|---|---|---|
| EP | 1010725 A2 | 6/2000 |
| EP | 1 069 156 A1 | 1/2001 |
| EP | 1069154 A | 1/2001 |
| EP | 1117742 AO | 7/2001 |
| EP | 1209163 A1 | 5/2002 |
| EP | 2204412 A1 | 7/2010 |
| GB | 1042783 A1 | 9/1966 |
| JP | 59-149912 A | 8/1984 |
| JP | 59-202240 | 11/1984 |
| JP | 04-023856 A | 1/1992 |
| JP | 04-359954 A | 12/1992 |
| JP | 61 00785 | 1/1994 |
| JP | 06-100785 | 4/1994 |
| JP | 06-313089 A | 11/1994 |
| JP | 7-76649 | 3/1995 |
| JP | 08-012868 A | 1/1996 |
| JP | 8-208884 | 8/1996 |
| JP | 08-239544 A | 9/1996 |
| JP | 09-053009 A | 2/1997 |
| JP | 10-017762 A | 1/1998 |
| JP | 2000-154277 A1 | 6/2000 |
| JP | 2001-049072 A | 2/2001 |
| JP | 2001-226576 A | 8/2001 |
| JP | 2001-316580 A | 11/2001 |
| JP | 2002-080676 A | 3/2002 |
| JP | 2002-348457 A | 12/2002 |
| JP | 2005-247999 A | 9/2005 |
| JP | 2006-131833 A | 5/2006 |
| JP | 2006-249288 A | 9/2006 |
| JP | 2006-249292 A | 9/2006 |
| JP | 2006-257126 A | 9/2006 |
| JP | 2006-257284 A | 9/2006 |
| JP | 2006-342246 A | 12/2006 |
| JP | 2007-023227 | 2/2007 |
| JP | 2008-292853 A1 | 12/2008 |
| JP | 2014-040512 A | 3/2014 |
| KR | 1994-0014647 | 7/1994 |
| KR | 1996-14253 A | 5/1996 |
| KR | 1999-33150 A | 5/1999 |
| KR | 1999-47019 A1 | 7/1999 |
| KR | 2000 41992 A1 | 1/2000 |
| KR | 1020000009218 A | 2/2000 |
| KR | 10-2000-0048033 A | 7/2000 |
| KR | 1020000041993 A | 7/2000 |
| KR | 10-2000-0055347 A1 | 9/2000 |
| KR | 2001 109044 A1 | 12/2001 |
| KR | 2002 6350 A1 | 1/2002 |
| KR | 100360710 B | 10/2002 |
| KR | 2002 83711 A1 | 11/2002 |
| KR | 2001 107423 A1 | 12/2002 |
| KR | 1020020094345 A | 12/2002 |
| KR | 10-2003-0020584 A | 3/2003 |
| KR | 10-2003-0055443 A | 7/2003 |
| KR | 2003-0095537 A | 12/2003 |
| KR | 10-2004-0007788 A | 1/2004 |
| KR | 1020040058809 A | 7/2004 |
| KR | 2004-079118 A | 9/2004 |
| KR | 10-2006-0109470 A | 10/2006 |
| KR | 648114 B1 | 11/2006 |
| KR | 10-0666797 B1 | 1/2007 |
| KR | 10-0767428 B1 | 10/2007 |
| KR | 885819 B1 | 12/2007 |
| KR | 10-2008-0036790 A | 4/2008 |
| KR | 2009-0029539 A | 3/2009 |
| KR | 10-902352 | 6/2009 |
| KR | 10-2011-0079489 A | 7/2011 |
| KR | 10-2012-006839 A | 1/2012 |
| KR | 10-2012-0042026 A | 5/2012 |
| KR | 10-2012-0078417 A | 7/2012 |
| KR | 10-2013-0076616 A | 7/2013 |
| KR | 10-2013-0078747 | 7/2013 |
| NO | 2008/081791 A1 | 7/2008 |
| WO | 99 19383 A1 | 4/1999 |
| WO | 99/57198 A1 | 11/1999 |
| WO | 00/6648 A1 | 2/2000 |
| WO | 00/18844 A1 | 4/2000 |
| WO | 00 00544 A1 | 1/2001 |
| WO | 01/66634 A | 9/2001 |
| WO | 00 09518 A1 | 2/2002 |
| WO | 02 46287 A1 | 6/2002 |
| WO | 03/020827 A1 | 3/2003 |
| WO | 03/022928 A1 | 3/2003 |
| WO | 03/042303 A1 | 5/2003 |
| WO | 03/042305 A1 | 5/2003 |
| WO | 2004/007611 A1 | 1/2004 |
| WO | 2006 041237 A1 | 4/2006 |
| WO | 2007/004434 | 1/2007 |
| WO | 2007/119920 A1 | 10/2007 |
| WO | 2007/140101 A1 | 12/2007 |
| WO | 2009/078593 A1 | 6/2009 |
| WO | 2009/078602 A1 | 6/2009 |
| WO | 2009/113762 A2 | 9/2009 |
| WO | 2009/116722 A1 | 9/2009 |
| WO | 2009/128601 A | 10/2009 |

OTHER PUBLICATIONS

International Search Report dated Jul. 14, 2005 in commonly owned international publication No. PCT/KR2004/003457, pp. 1.
International Preliminary Report on Patentability dated Jan. 25, 2007 in commonly owned international publication No. PCT/KR2004/003457, pp. 1-23.
Office Action in commonly owned U.S. Appl. No. 12/961,877 dated Jul. 30, 2012, pp. 1-14.
European Search Report in commonly owned European Application No. 14194463.7 dated Apr. 23, 2015, pp. 1-2.
Search Report in commonly owned Chinese Application No. 201310737841.6 dated Apr. 22, 2015, pp. 1-2.
Baek et al., electronic translation of KR 10-666797, 1-2007, pp. 1-6.
Non-Final Office Action in commonly owned U.S. Appl. No. 14/097,538 dated Mar. 26, 2015, pp. 1-11.
Non-Final Office Action in commonly owned U.S. Appl. No. 14/097,538 dated Aug. 11, 2015, pp. 1-6.
Final Office Action in commonly owned U.S. Appl. No. 14/097,538 dated Nov. 23, 2015, pp. 1-7.
Notice of Allowance in commonly owned U.S. Appl. No. 14/097,538 dated Mar. 30, 2016, pp. 1-9.
Extended Search Report in commonly owned European Application No. 15194797.5 dated Mar. 18, 2016, pp. 1-7.
Non-Final Office Action in commonly owned U.S. Appl. No. 14/749,861 dated Nov. 20, 2015, pp. 1-17.
Final Office Action in commonly owned U.S. Appl. No. 14/747,207 dated Dec. 5, 2016, pp. 1-8.
Non-Final Office Action in commonly owned U.S. Appl. No. 14/750,364 dated Jun. 16, 2016, pp. 1-7.
Notice of Allowance in commonly owned U.S. Appl. No. 14/750,364 dated Oct. 6, 2016, pp. 1-8.
Non-Final Office Action in commonly owned U.S. Appl. No. 14/748,576 dated Feb. 16, 2016, pp. 1-9.
Notice of Allowance in commonly owned U.S. Appl. No. 14/748,576 dated Jun. 29, 2016, pp. 1-9.
Final Office Action in commonly owned U.S. Appl. No. 14/749,861 dated May 31, 2016, pp. 1-9.
Notice of Allowance in commonly owned U.S. Appl. No. 14/749,861 dated Aug. 25, 2016, pp. 1-7.
Non-Final Office Action in commonly owned U.S. Appl. No. 14/557,478 dated Jun. 4, 2015, pp. 1-9.
Final Office Action in commonly owned U.S. Appl. No. 14/557,478 dated Oct. 30, 2015, pp. 1-6.
Notice of Allowance in commonly owned U.S. Appl. No. 14/557,478 dated Feb. 18, 2016, pp. 1-5.
Non-Final Office Action in commonly owned U.S. Appl. No. 14/930,954 dated Oct. 18, 2016, pp. 1-13.
European Search Report in commonly owned European Application No. 08862371 dated Dec. 7, 2010, pp. 1-6.
International Search Report in commonly owned International Application No. PCT/KR2008/006870, dated May 28, 2009, pp. 1-2.
Office Action in commonly owned U.S. Appl. No. 12/631,018 dated Nov. 8, 2011, pp. 1-10.

(56) References Cited

OTHER PUBLICATIONS

Chinese Office Action in commonly owned Chinese Application No. 200910211954 dated Jun. 23, 2011, pp. 1-5.
English translation of Chinese Office Action in commonly owned Chinese Application No. 200910211954 dated Jun. 23, 2011, pp. 1-5.
Katrizky et al., "Correlation and Prediction of the Refractive Indices of Polymers by QSPR", Journal of Chemical Information and Computer Sciences, pp. 1171-1176, (1998).
Office Action in commonly owned U.S. Appl. No. 12/642,904 dated Dec. 14, 2011, pp. 1-9.
European Search Report in commonly owned European Application No. 09180634 dated Feb. 2, 2010, pp. 1-3.
Xu, "Predicition of Refractive Indices of Linear Polymers by a four-descriptor QSPR model", Polymer, 45 (2004) pp. 8651-8659.
European Search Report in commonly owned European Application No. 10196806 dated Apr. 27, 2011, pp. 1-5.
Office Action in commonly owned U.S. Appl. No. 12/631,018 dated Apr. 26, 2012, pp. 1-12.
Office Action in commonly owned U.S. Appl. No. 12/642,904 dated Mar. 27, 2012, pp. 1-7.
Notice of Allowance in commonly owned U.S. Appl. No. 12/642,904 dated Jul. 2, 2012, pp. 1-8.
Office Action in commonly owned U.S. Appl. No. 12/817,302 dated Mar. 29, 2012, pp. 1-5.
Office Action in commonly owned U.S. Appl. No. 12/884,549 dated Aug. 21, 2012, pp. 1-12.
Mark, Physical Properties of Polymers Handbook, 2nd Edition, Polymer Research Center and Department of Chemistry, University of Cincinnati, OH, (2007) Springer, pp. 5-7.
Polysciences, Inc., data sheet for benzyl acrylate, no date, pp. 1-2.
Guidechem, data sheet for RUBA-93, no date, pp. 1-2.
European Search Report in commonly owned European Application No. 08873329.0 dated Dec. 14, 2012, pp. 1-7.
Office Action in commonly owned U.S. Appl. No. 12/972,795 dated Jan. 18, 2013, pp. 1-9.
International Search Report in commonly owned International Application No. PCT/KR2008/07825 dated Aug. 28, 2009, pp. 1-2.
Machine translation of JP 2006-257284, pp. 1-27 (2006).
Office Action in commonly owned U.S. Appl. No. 12/880,209 dated Feb. 16, 2011, pp. 1-10.
International Search Report in commonly owned International Application No. PCT/KR2008/07820 dated Jul. 28, 2009, pp. 1-2.
Final Office Action in commonly owned U.S. Appl. No. 12/880,209 dated Jul. 29, 2011, pp. 1-9.
Advisory Action in commonly owned U.S. Appl. No. 12/880,209 dated Nov. 4, 2011, pp. 1-4.
International Search Report in commonly owned International Application No. PCT/KR2008/007157, dated May 28, 2009.
Final Office Action in commonly owned U.S. Appl. No. 12/792,176 dated Apr. 19, 2012, pp. 1-10.
Advisory Action in commonly owned U.S. Appl. No. 12/792,176 dated Aug. 23, 2012, pp. 1-4.
European Search Report in commonly owned European Application No. 08873425.6 dated May 29, 2012, pp. 1-5.
Notice of Allowance in commonly owned U.S. Appl. No. 12/880,209 dated Oct. 10, 2013, pp. 1-10.
Paris et al., "Glass Transition Temperature of Allyl Methacrylate-n-Butyl Acrylate Gradient Copolymers in Dependence on Chemical Composition and Molecular Weight", Journal of Polymer Science, Part A (2007) pp. 1-11.
Wunderlich, "Thermal Analysis of Polymeric Materials", Springer, New York, US (2005) pp. 1-5.
European Search Report for commonly owned European Application No. EP 04808586, completed on Sep. 25, 2007.
English-translation of Chinese Office Action in commonly owned Chinese Application No. 200880128614.0 dated Mar. 7, 2012, pp. 1-2.
Advisory Action in commonly owned U.S. Appl. No. 12/631,018 dated Nov. 7, 2012, pp. 1-3.
Final Office Action in commonly owned U.S. Appl. No. 12/817,302 dated Feb. 7, 2013, pp. 1-6.
Final Office Action in commonly owned U.S. Appl. No. 12/884,549 dated Dec. 18, 2012, pp. 1-7.
Notice of Allowance in commonly owned U.S. Appl. No. 12/884,549 dated Apr. 11, 2013, pp. 1-8.
European Search Report in commonly owned European Application No. 07024808, dated Mar. 18, 2008, pp. 1-2.
Machine Translation of JP 10-017762 (2011).
Derwent Abstract of JP 2002348457 (A) (2003).
Full English Translation of JP-10-017762 (2011).
Advisory Action in commonly owned U.S. Appl. No. 12/817,302 dated May 16, 2013, pp. 1-5.
Office Action in commonly owned U.S. Appl. No. 12/898,012 dated Dec. 21, 2012, pp. 1-6.
Notice of Allowance in commonly owned U.S. Appl. No. 12/972,795 dated May 24, 2013, pp. 1-8.
European Search Report in commonly owned European Application No. 10194938.6 dated Jul. 21, 2011, pp. 1-5.
Notice of Allowance in commonly owned U.S. Appl. No. 12/961,877 dated Jun. 19, 2013, pp. 1-10.
Final Office Action in commonly owned U.S. Appl. No. 12/961,877 dated Nov. 28, 2012, pp. 1-10.
Advisory Action in commonly owned U.S. Appl. No. 12/961,877 dated Mar. 12, 2013, pp. 1-2.
Silicones: An Introduction to Their Chemistry and Application, The Plastics Institute 1962, p. 27.
Extended European Search Report in commonly owned European Application No. 09180865.9, dated Apr. 16, 2010.
Office Action in commonly owned Chinese Application No. 201510364557.8 dated Mar. 31, 2017, pp. 1-6.
Office Action in commonly owned Chinese Application No. 201510792588.3 dated Mar. 10, 2017, pp. 1-7.
Office Action in commonly owned U.S. Appl. No. 14/747,207 dated Jul. 25, 2017, pp. 1-9.

* cited by examiner

THERMOPLASTIC RESIN COMPOSITION AND LOW-GLOSS MOLDED ARTICLE MADE THEREFROM

CROSS-REFERENCE TO RELATED APPLICATION

This application claims priority under 35 USC Section 119 to and the benefit of Korean Patent Application Nos. 10-2014-0079844, filed on Jun. 27, 2014, and 10-2014-0140473, filed on Oct. 17, 2014, in the Korean Intellectual Property Office, the entire disclosure of each of which is incorporated herein by reference.

FIELD OF THE INVENTION

The present invention relates to a thermoplastic resin composition and a molded article made therefrom.

BACKGROUND

In general, acrylonitrile-butadiene-styrene (ABS) resins have been widely used for various purposes, such as automobile components, electric and electronic products, office machinery, home appliances, toys, stationery, and the like, due to beautiful appearance characteristics, and physical properties such as impact resistance of butadiene, processability, moldability and colorability of styrene, hardness and chemical resistance of acrylonitrile, etc. Most of such ABS resins are glossy, and exhibit high gloss or intermediate surface gloss.

In recent years, there has been an increasing demand for low-gloss and gloss-less resins to create a desired aesthetic appearance and prevent glare. Also, with the rise of environmental issues, gloss-less resins tend to be directly used without using a process of applying a gloss-less paint or covering a pad.

Conventional gloss-less resin compositions can be prepared by adding or modifying a certain rubbery component. However, such a method can have problems in that a low-gloss effect can be poor, and impact strength and heat resistance can be degraded.

Another method graft-polymerizes a monomer such as ethylenically unsaturated carboxylic acid into an ABS polymer to solve the above problems. The prepared ABS polymer can have various good physical properties, but also can have degraded heat resistance.

U.S. Pat. No. 5,475,053 discloses a method of reducing gloss of a resin using a spherical graft copolymer as a matting agent, and Korean Unexamined Patent Application Publication No. 2008-0036790 discloses a method of reducing gloss using various copolymers as additives.

Also, U.S. Pat. No. 5,237,004 discloses a method of reducing gloss using rubber particles having a core/shell structure having a large particle size of 0.05 to 20 μm or 2 to 15 μm.

However, when the additive is used as in the technique described above, the manufacturing cost may increase, and problems such as peeling, degradation of physical properties, and a partial increase in gloss may be caused. Also, when large-sized rubber particles are used, gloss may be reduced, but impact strength may be significantly degraded.

Therefore, there is a demand for techniques capable of improving processability, impact resistance, hardness and/or low-gloss properties of a thermoplastic resin composition, such as an aromatic vinyl based thermoplastic resin composition.

SUMMARY

Exemplary embodiments provide a thermoplastic resin composition that can have improved resin dispersibility, fluidity, and/or uniformity in appearance by enhancing the degree of cross-linking of a polymer to maximize a matt effect and simultaneously adjusting a particle size of the polymer.

Also, exemplary embodiments provide a molded article that can have excellent matt characteristics, impact resistance and/or appearance characteristics, which is prepared from the thermoplastic resin composition.

The thermoplastic resin composition according to one exemplary embodiment of the present invention includes (A) a rubber-modified graft copolymer, (B) an aromatic vinyl-vinyl cyanide-based copolymer, and (C) a silicone-modified aromatic vinyl-vinyl cyanide-based copolymer, wherein (C) the silicone-modified aromatic vinyl-vinyl cyanide-based copolymer has an average particle size of about 100 μm or less.

In exemplary embodiments, (C) the silicone-modified aromatic vinyl-vinyl cyanide-based copolymer may be cross-linked.

In exemplary embodiments, (C) the silicone-modified aromatic vinyl-vinyl cyanide-based copolymer may be a copolymer of a mixture of monomers including (C1) an aromatic vinyl-based monomer, (C2) an unsaturated nitrile-based monomer, and (C3) a cross-linkable monomer.

In exemplary embodiments, (C) the silicone-modified aromatic vinyl-vinyl cyanide-based copolymer may be a copolymer formed of a mixture of monomers including (C3) the cross-linkable monomer in an amount of about 0.1 to about 20 parts by weight, based on about 100 parts by weight of a mixture of monomers including (C1) the aromatic vinyl-based monomer in an amount of about 60 to about 80% by weight and (C2) the unsaturated nitrile-based monomer in an amount of about 20 to about 40% by weight.

In exemplary embodiments, (C1) the aromatic vinyl-based monomer may include at least one selected from the group consisting of styrene, α-methylstyrene, β-methylstyrene, p-methylstyrene, p-t-butylstyrene, ethylstyrene, vinylxylene, monochlorostyrene, dichlorostyrene, dibromostyrene, vinylnaphthalene, and mixtures thereof.

In exemplary embodiments, (C2) the unsaturated nitrile-based monomer may include at least one selected from the group consisting of acrylonitrile, methacrylonitrile, ethacrylonitrile, phenylacrylonitrile, α-chloroacrylonitrile, fumaronitrile, and mixtures thereof.

In exemplary embodiments, (C3) the cross-linkable monomer may be represented by the following Formula 1.

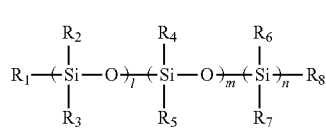

[Formula 1]

In Formula 1, l, m and n are the same or different and are each independently an integer ranging from 0 to 100 (provided that l, m and n are not zero at the same time), and $R_1$ $R_2$, $R_3$, $R_4$, $R_5$, $R_6$, $R_7$, and $R_8$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, provided that at least two of $R_1$, $R_2$, $R_3$, $R_4$, $R_5$, $R_6$, $R_7$, and $R_8$ include a polymerizable unsaturated reactive group.

In exemplary embodiments, (C3) the cross-linkable monomer may be represented by the following Formula 2.

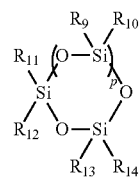

[Formula 2]

In Formula 2, $R_9$, $R_{10}$, $R_{11}$, $R_{12}$, $R_{13}$ and $R_{14}$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, and p is an integer ranging from 1 to 6, provided that at least two of $R_9$, $R_{10}$, $R_{11}$, $R_{12}$, $R_{13}$, and $R_{14}$ include a polymerizable unsaturated reactive group.

In exemplary embodiments, (C3) the cross-linkable monomer may include at least one selected from the group consisting of 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, and mixtures thereof.

In exemplary embodiments, (C) the silicone-modified aromatic vinyl-vinyl cyanide-based copolymer may have an average particle size of about 1 to about 80 μm.

In exemplary embodiments, the thermoplastic resin composition may include (A) the rubber-modified graft copolymer in an amount of about 10 to about 40% by weight, (B) the aromatic vinyl-vinyl cyanide-based copolymer in an amount of about 20 to about 90% by weight, and (C) the silicone-modified aromatic vinyl-vinyl cyanide-based copolymer in an amount of about 1 to about 30% by weight.

The molded article according to one exemplary embodiment of the present invention may include the thermoplastic resin composition.

In exemplary embodiments, the molded article may have a melt-flow index of about 3 to about 30 g/10 min, as measured under conditions of a temperature of 220° C. and a load of 10 kg by an evaluation method according to ASTM D1238, and may have a gloss of about 70% or less, as measured at an angle of 60° by an evaluation method according to ASTM D523.

DETAILED DESCRIPTION

Figure 1:
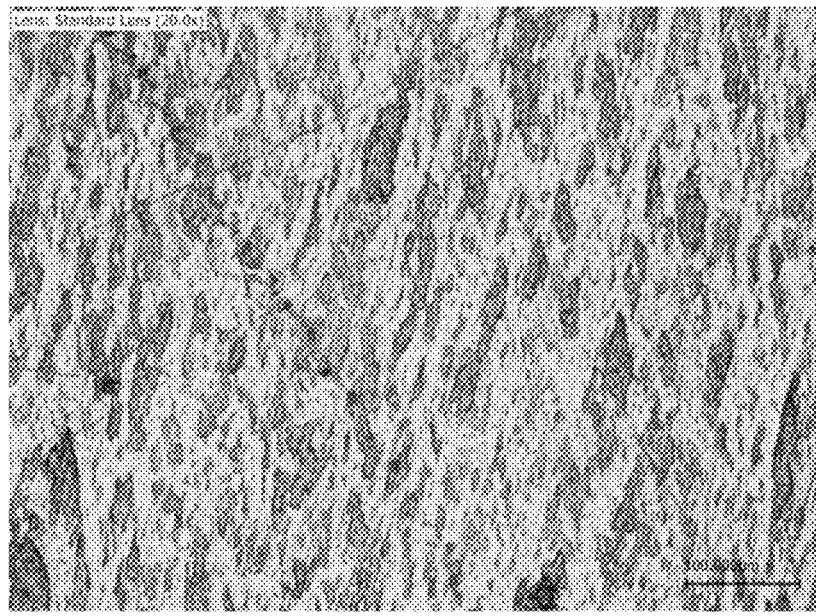
FIG. 1 is an image obtained by magnifying, 20 times, a surface of a specimen prepared in Example 1 using a shape measuring laser microscope VK-X200 commercially available from Keyence Corp.
Figure 2:
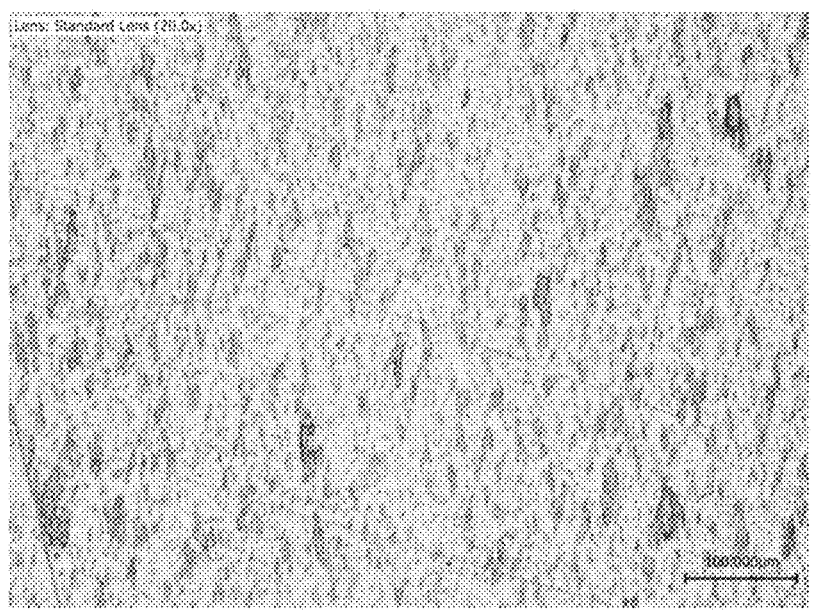
FIG. 2 is an image obtained by magnifying a surface of a specimen prepared in Example 3 in the same manner as in FIG. 1.
Figure 3:
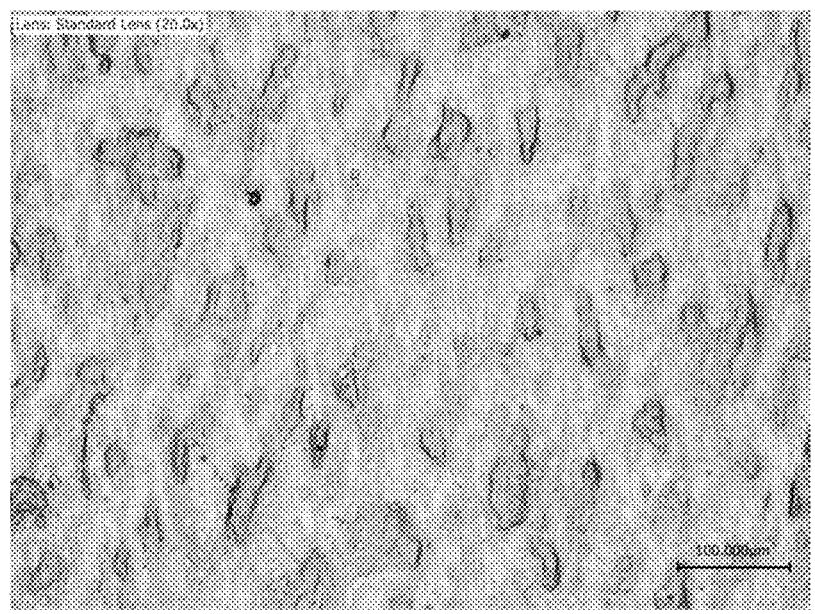
FIG. 3 is an image obtained by magnifying a surface of a specimen prepared in Comparative Example 3 in the same manner as in FIG. 1.

Exemplary embodiments now will be described more fully hereinafter in the following detailed description, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

Hereinafter, a thermoplastic resin composition according to exemplary embodiments of the present invention, and a molded article having a low-gloss property, which includes the thermoplastic resin composition, will be described in detail with reference to the following detailed description and accompanying drawings. Exemplary embodiments disclosed herein are provided as examples for the purpose of sufficiently providing the scope of the present invention to those skilled in the related art. Also, unless specifically stated otherwise, all the technical and scientific terms used in this specification have the same meanings as what are generally understood by a person skilled in the related art to which the present invention belongs. In the following description, detailed descriptions of well-known functions or constructions will be omitted since they would obscure the invention in unnecessary detail.

In this specification, the term "(meth)acrylate" is intended to include both "acrylate" and "methacrylate," the term "(meth)acrylic acid alkyl ester" is intended to include both an "acrylic acid alkyl ester" and a "methacrylic acid alkyl ester," and the term "(meth)acrylic acid ester" is intended to include both "acrylic acid ester" and "methacrylic acid ester."

The present inventors have conducted research to address problems associated with conventional aromatic vinyl based resin compositions, such as the use of a large amount of a component having matting characteristics due to a low degree of cross-linking, and thus degradation of processability and surface uniformity due to a decrease in fluidity of the composition. The inventors have found that the composition according to exemplary embodiments can have improved matting efficiency and fluidity due to a high degree of dispersion while maintaining a degree of cross-linking when a silicone-modified aromatic vinyl-vinyl cyanide-based copolymer having matting characteristics has an average particle size within a certain particle size range. The present invention has been completed based on these facts.

In exemplary embodiments, the thermoplastic resin composition includes (A) a rubber-modified graft copolymer, (B) an aromatic vinyl-vinyl cyanide-based copolymer, and (C) a silicone-modified aromatic vinyl-vinyl cyanide-based copolymer.

Hereinafter, the respective components of the thermoplastic resin composition according to exemplary embodiments of the present invention will be described in further detail.

(A) Rubber-Modified Graft Copolymer

In exemplary embodiments, the rubber-modified graft copolymer may be prepared by grafting an aromatic vinyl-based monomer and a vinyl cyanide monomer into conjugated diene rubber latex.

The conjugated diene-based rubber latex that may be used herein may include typical butadiene rubber latex or styrene-butadiene copolymerized rubber latex, but the present invention is not limited thereto. The conjugated diene-based rubber latex can have an average particle diameter of about 0.1 to about 5.0 μm. The graft copolymer may include the conjugated diene-based rubber latex in an amount of about 5 to about 70% by weight, based on the total weight (100% by weight) of the graft copolymer.

Examples of the aromatic vinyl-based monomer may include without limitation styrene, $C_1$ to $C_{10}$ alkyl-substituted styrene, halogen-substituted styrene, vinyltoluene, vinylnaphthalene, and the like, and combinations thereof. Examples of the alkyl-substituted styrene may include without limitation α-methylstyrene, o-ethylstyrene, m-ethylstyrene, p-ethylstyrene, and the like, and combinations thereof.

Examples of the vinyl cyanide monomer that may be used herein may include without limitation acrylonitrile, methacrylonitrile, ethacrylonitrile, and the like, and combinations thereof. In exemplary embodiments, the vinyl cyanide monomer may include acrylonitrile.

A conventional method such as emulsion polymerization, suspension polymerization, solution polymerization, and bulk polymerization methods may be used to prepare the graft copolymer. Emulsion polymerization or bulk polymerization may be performed in the presence of the components using a polymerization initiator.

(B) Aromatic Vinyl-Vinyl Cyanide-Based Copolymer

In exemplary embodiments, the aromatic vinyl-vinyl cyanide-based copolymer may be a copolymer of an aromatic vinyl-based monomer and a vinyl cyanide monomer.

Examples of the aromatic vinyl-based monomer may include without limitation styrene, $C_1$ to $C_{10}$ alkyl-substituted styrene, halogen-substituted styrene, vinyltoluene, vinylnaphthalene, and the like, and combinations thereof. Examples of the alkyl-substituted styrene may include without limitation α-methyl styrene, p-methyl styrene, o-ethyl styrene, m-ethyl styrene, p-ethyl styrene, p-t-butylstyrene, 2,4-dimethylstyrene, and the like, and combinations thereof.

Examples of the vinyl cyanide monomer may include without limitation acrylonitrile, methacrylonitrile, ethacrylonitrile, and the like, and combinations thereof Examples of the aromatic vinyl-vinyl cyanide-based copolymer may include without limitation a copolymer of styrene and acrylonitrile; a copolymer of α-methylstyrene and acrylonitrile; and/or a copolymer of styrene, α-methylstyrene and acrylonitrile, for example, a copolymer of styrene and acrylonitrile.

(C) Silicone-Modified Aromatic Vinyl-Vinyl Cyanide-Based Copolymer

In exemplary embodiments, the silicone-modified aromatic vinyl-vinyl cyanide-based copolymer may be prepared by polymerizing a mixture of monomers including (C1) an aromatic vinyl-based monomer, (C2) an unsaturated nitrile-based monomer, and (C3) a cross-linkable monomer.

Examples of the aromatic vinyl-based monomer (C1) may include without limitation styrene, α-methylstyrene, β-methylstyrene, p-methylstyrene, p-t-butylstyrene, ethylstyrene, vinylxylene, monochlorostyrene, dichlorostyrene, dibromostyrene, vinylnaphthalene, and the like, and mixtures thereof.

Examples of the unsaturated nitrile-based monomer (C2) may include without limitation acrylonitrile, methacrylonitrile, ethacrylonitrile, phenylacrylonitrile, α-chloroacrylonitrile, fumaronitrile, and the like, and mixtures thereof.

Examples of the cross-linkable monomer (C3) may include without limitation one or two or more compounds represented by the following Formula 1.

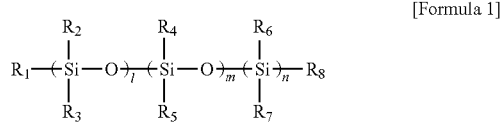

[Formula 1]

In Formula 1, l, m and n are the same or different and are each independently an integer ranging from 0 to 100 (provided that l, m and n are not zero at the same time), and $R_1$, $R_2$, $R_3$, $R_4$, $R_5$, $R_6$, $R_7$, and $R_8$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, provided that at least two of $R_1$, $R_2$, $R_3$, $R_4$, $R_5$, $R_6$, $R_7$, and $R_8$ include a polymerizable unsaturated reactive group.

The cross-linkable monomer (C3) may include one or two or more compounds represented by the following Formula 2, wherein the compounds have a ring-shape structure.

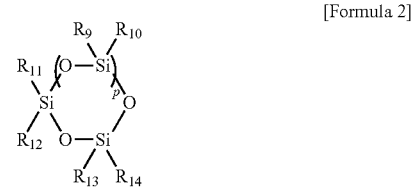

[Formula 2]

In Formula 2, $R_9$, $R_{10}$, $R_{11}$, $R_{12}$, $R_{13}$ and $R_{14}$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, and p is an integer ranging from 1 to 6, provided that at least two of $R_9$, $R_{10}$, $R_{11}$, $R_{12}$, $R_{13}$, and $R_{14}$ include a polymerizable unsaturated reactive group.

As used herein, the term "substituted" means that one or more hydrogen atoms are substituted with one or more substituents, such as but not limited to one or more of a halogen group, a $C_1$ to $C_{30}$ alkyl group, a $C_1$ to $C_{30}$ haloalkyl group, a $C_6$ to $C_{30}$ aryl group, a $C_2$ to $C_{30}$ heteroaryl group, a $C_1$ to $C_{20}$ alkoxy group, or a combination thereof. As used herein, the term "hetero" refers to a nitrogen, sulfur, oxygen, and/or phosphorus atom in place of a carbon atom.

Examples of (C3) the cross-linkable monomer may be include without limitation 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinylcyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, and the like, and mixtures thereof.

The silicone-modified aromatic vinyl-vinyl cyanide-based copolymer (C) may be in the form of a spherical bead, and may have effects such as excellent compatibility with the composition, and remarkable matting characteristics and fluidity while maintaining a high molecular weight.

The silicone-modified aromatic vinyl-vinyl cyanide-based copolymer (C) may be polymerized using a conventional method such as bulk polymerization, solution polymerization, emulsion polymerization, or suspension polymerization so as to maintain the shape, but may be polymerized using a method of preparing fine particles so as to adjust an average particle size of the polymer within a certain particle size range.

For example, the silicone-modified aromatic vinyl-vinyl cyanide-based copolymer (C) can be prepared using suspension polymerization. In an exemplary suspension polymerization method, monomers (C1), (C2), and (C3) may be mixed, and a polymerization initiator and a suspension stabilizer may be added to perform polymerization. In this case, the polymerization may be performed at a polymerization temperature of about 30 to about 120° C., for example about 50 to about 90° C.

Examples of the polymerization initiator that may be used may include without limitation a peroxide-based compound such as benzoyl peroxide, lauryl peroxide, o-chlorobenzoyl peroxide, o-methoxybenzoyl peroxide, t-butylperoxy-2-ethylhexanoate, t-butyl peroxyisobutyrate, 1,1,3-3-tetramethyl-butylperoxy-2-ethylhexanoate, dioctanoyl peroxide, and/or didecanoyl peroxide, and/or an azo compound such as 2,2'-azobis(isobutyronitrile), 2,2'-azobis(2-methylbutyronitrile), and/or 2,2'-azobis(2,4-dimethylvaleronitrile). The polymerization initiator may be used in an amount of about 0.1 to about 20 parts by weight, based on about 100 parts by weight of the mixture.

Examples of the suspension stabilizer may include without limitation gelatin, starch, methylcellulose, ethylcellulose, hydroxyethylcellulose, carboxymethylcellulose, polyvinyl pyrrolidone, polyvinyl alkyl ether, polyvinyl alcohol, polyacrylic acid, polyacrylamide, polyethylene oxide, polymethacrylic acid sodium, a water-soluble polymer such as a polydimethylsiloxane/polystyrene block copolymer, barium sulfate, calcium lactate, calcium carbonate, calcium phosphate, aluminum lactate, talc, clay, diatomite, and/or a metal oxide powder. An amount of the added suspension stabilizer may also be freely adjusted according to the average particle size of the silicone-modified aromatic vinyl-vinyl cyanide-based copolymer, but the present invention is not particularly limited thereto.

The suspension stabilizer may be dissolved in a dispersing medium to prepare a suspension. The dispersing medium is not limited as long as it is a material that may be used to dissolve the suspension stabilizer. For example, ionic water and the like may be used.

Also, the average particle size of the silicone-modified aromatic vinyl-vinyl cyanide-based copolymer may be adjusted to about 100 µm or less using a high-speed homogenizer, when necessary. The mixture of monomers can be added to the suspension and then homogenized using a high-speed homogenizer. In this case, a degree of homogenization may be freely adjusted according to the average particle size of the silicone-modified aromatic vinyl-vinyl cyanide-based copolymer. The emulsion thus homogenized may be subjected to a polymerization reaction at the polymerization temperature under an inert gas atmosphere.

The silicone-modified aromatic vinyl-vinyl cyanide-based copolymer may have an average particle size of about 100 µm or less, for example about an average particle size of 1 to about 80 µm. In exemplary embodiments, the average particle size of the silicone-modified aromatic vinyl-vinyl cyanide-based copolymer may be in a range of 20 to about 80 µm. When the average particle size of the silicone-modified aromatic vinyl-vinyl cyanide-based copolymer is greater than about 100 µm, a quenching effect and/or fluidity may be severely degraded. In this case, the silicone-modified aromatic vinyl-vinyl cyanide-based copolymer may be increasingly added to improve a quenching effect.

In some embodiments, the silicone-modified aromatic vinyl-vinyl cyanide-based copolymer (C) may have an average particle size of greater than 0, about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 µm. Also, the average particle size of the silicone-modified aromatic vinyl-vinyl cyanide-based copolymer may be greater than or equal to one of the approximate values and less than or equal to one of the approximate values.

In exemplary embodiments, (C) the silicone-modified aromatic vinyl-vinyl cyanide-based copolymer may be prepared from a mixture including (C3) the cross-linkable monomer in an amount of about 0.1 to about 20 parts by weight, based on about 100 parts by weight of a mixture of monomers including (C1) the aromatic vinyl-based compound in an amount of about 60 to about 80% by weight and (C2) the unsaturated nitrile-based compound in an amount of about 20 to about 40% by weight.

In some embodiments, the aromatic vinyl-based monomer (C1) may be included in an amount of about 60, 61, 62, 63, 64, 65, 66, 67, 68, 69, 70, 71, 72, 73, 74, 75, 76, 77, 78, 79, or 80% by weight, based on the total weight (100% by weight) of the mixture of monomers including (C1) the aromatic vinyl-based monomer and (C2) the unsaturated nitrile-based compound of (C) the silicone-modified aromatic vinyl-vinyl cyanide-based copolymer. Further, according to some embodiments, the amount of the aromatic vinyl-based monomer (C1) can be in a range from about any of the foregoing amounts to about any other of the foregoing amounts.

In some embodiments, the unsaturated nitrile-based monomer (C2) may be included in an amount of about 20, 21, 22, 23, 24, 25, 26, 27, 28, 29, 30, 31, 32, 33, 34, 35, 36, 37, 38, 39, or 40% by weight, based on the total weight (100% by weight) of the mixture of monomers including (C1) the aromatic vinyl-based monomer and (C2) the unsaturated nitrile-based compound of (C) the silicone-modified aromatic vinyl-vinyl cyanide-based copolymer. Further, according to some embodiments, the amount of the unsaturated nitrile-based monomer (C2) can be in a range from about any of the foregoing amounts to about any other of the foregoing amounts.

In exemplary embodiments, the cross-linkable monomer (C3) may be included in an amount of about 0.1, 0.2, 0.3, 0.4, 0.5, 0.6, 0.7, 0.8, 0.9, 1.0, 1.1 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, or 20.0 parts by weight, based on about 100 parts by weight of the mixture of monomers including (C1) the aromatic vinyl-based monomer and (C2) the unsaturated nitrile-based compound of (C) the silicone-modified aromatic vinyl-vinyl cyanide-based copolymer. Further, according to some embodiments, the amount of the cross-linkable monomer (C3) can be in a range from about any of the foregoing amounts to about any other of the foregoing amounts.

In exemplary embodiments, the thermoplastic resin composition may include (A) the rubber-modified graft copolymer in an amount of about 10 to about 40% by weight, (B) the aromatic vinyl-vinyl cyanide-based copolymer in an amount of about 20 to about 90% by weight, and (C) the silicone-modified aromatic vinyl-vinyl cyanide-based copolymer in an amount of about 1 to about 30% by weight, based on the total weight (100% by weight) of (A), (B) and (C), but the present invention is not particularly limited thereto.

In some embodiments, the thermoplastic resin composition may include (A) the rubber-modified graft copolymer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40% by weight. Further, according to some embodiments, the amount of the rubber-modified graft copolymer can be in a range from about any of the foregoing amounts to about any other of the foregoing amounts.

In some embodiments, the thermoplastic resin composition may include (B) the aromatic vinyl-vinyl cyanide-based copolymer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90% by weight. Further, according to some embodiments, the amount of the aromatic vinyl-vinyl cyanide-based copolymer can be in a range from about any of the foregoing amounts to about any other of the foregoing amounts.

In some embodiments, the thermoplastic resin composition may include (C) the silicone-modified aromatic vinyl-vinyl cyanide-based copolymer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30% by weight. Further, according to some embodiments, the amount of the silicone-modified aromatic vinyl-vinyl cyanide-based copolymer can be in a range from about any of the foregoing amounts to about any other of the foregoing amounts.

In exemplary embodiments, the thermoplastic resin composition may include one or more optional additive(s). Examples of the additives can include without limitation dyes, pigments, flame retardants, filler, stabilizers, slip agents, antibacterial agents, release agents, antistatic agents, antioxidants, and the like, to further give, for example, molding processability and physical property balance. The additives may be used alone or in combination.

The present invention provides a molded article prepared from the thermoplastic resin composition. Such a molded article may have excellent mechanical properties such as molding processability and impact resistance, and may exhibit excellent matting characteristics, and thus may be applied to various material fields such as electric and electronic products, housings, etc.

The molded article according to exemplary embodiments can have a melt-flow index of about 3 to about 30 g/10 min, as measured under conditions of a temperature of 220° C. and a load of 10 kg by an evaluation method according to ASTM D1238, and can have a gloss of about 70% or less, as measured at an angle of 60° by an evaluation method according to ASTM D523.

In exemplary embodiments, the molded article may have a melt-flow index of about 3, 4, 5, 6, 7, 8, 9, 10, 11, 12, 13, 14, 15, 16, 17, 18, 19, 20, 21, 22, 23, 24, 25, 26, 27, 28, 29, or 30 g/10 min, as measured under conditions of a temperature of 220° C. and a load of 10 kg by the evaluation method according to ASTM D1238. Also, the melt-flow index of the molded article may be greater than or equal to one of the approximate values and less than or equal to one of the approximate values, as measured under conditions of a temperature of 220° C. and a load of 10 kg by the evaluation method according to ASTM D1238.

In exemplary embodiments, the molded article may have a gloss of greater than 0, about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70%, as measured at an angle of 60° by the evaluation method according to ASTM D523. Also, the gloss of the molded article may be greater than or equal to one of the approximate values and less than or equal to one of the approximate values, as measured at an angle of 60° by the evaluation method according to ASTM D523.

In exemplary embodiments, the molded article can have a gloss of about 70% or less, as measured at an angle of 60° by an evaluation method according to ASTM D523, and can have an Izod impact strength of about 5 to about 30 kgf cm/cm, as measured for a ⅛ inch-thick specimen under notched conditions by an evaluation method according to ASTM D256.

In exemplary embodiments, the molded article may have a gloss of greater than 0, about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70%, as measured at an angle of 60° by the evaluation method according to ASTM D523. Also, the gloss of the molded article may be greater than or equal to one of the approximate values and less than or equal to one of the approximate values, as measured at an angle of 60° by the evaluation method according to ASTM D523.

In exemplary embodiments, the molded article may have an Izod impact strength of about 5, 6, 7, 8, 9, 10, 11, 12, 13, 14, 15, 16, 17, 18, 19, 20, 21, 22, 23, 24, 25, 26, 27, 28, 29, or 30 kgf•cm/cm, as measured for the ⅛ inch-thick specimen under the notched conditions by the evaluation method according to ASTM D256. Also, the Izod impact strength of the molded article may be greater than or equal to one of the approximate values and less than or equal to one of the approximate values, as measured for the ⅛ inch-thick specimen under the notched conditions by the evaluation method according to ASTM D256.

Hereinafter, exemplary embodiments of the present invention will be described in further detail with reference to the following examples. However, it should be understood that these examples are provided for illustration only and are not to be construed in any way as limiting the present invention. Specifications of the respective components used in Examples and Comparative Examples, and methods of measuring physical properties of the components are as follows.

(A) Rubber-Modified Graft Copolymer

A copolymer obtained by graft-polymerizing acrylonitrile and styrene into butadiene rubber latex is used. The copolymer includes the rubber latex in an amount of 58% by weight and acrylonitrile and styrene in an amount of 42% by weight, wherein acrylonitrile and styrene are included at a ratio of 76% by weight:24% by weight, and the average particle size of the rubber is 2,580 Å.

(B) Aromatic Vinyl-Vinyl Cyanide-Based Copolymer

A copolymer obtained by copolymerizing a styrene monomer and acrylonitrile is used. The copolymer (SAN resin) includes styrene in an amount of 76% by weight and acrylonitrile in an amount of 24% by weight.

(C) Silicone-Modified Aromatic Vinyl-Vinyl Cyanide-Based Copolymer

A siloxane-based cross-linking agent (SKC SILICONE) having a solid content of 98% is added in an amount as listed in the following Table 1 to 100 parts by weight of a mixture including styrene in an amount of 76% by weight and acrylonitrile in an amount of 24% by weight, and 0.2 parts by weight of azobisisobutyronitrile (AIBN) as a polymerization initiator is added to prepare a mixed solution. Thereafter, 0.2% by weight of polyvinyl alcohol as a suspension stabilizer is dissolved in ionic water, and the mixed solution is added thereto. The resulting mixture is homogenized using a high-speed homogenizer to prepare a suspension. Then, the suspension is reacted at 75° C. for 4 hours under a nitrogen atmosphere. As a result, a polymerization reaction is completed. The stirring rate and stirring time of the high-speed homogenizer are listed in the following Table 1.

TABLE 1

| | Silicone-based compound (parts by weight) | Stirring rate (rpm) | Stirring time (min) | Average particle size (μm) |
|---|---|---|---|---|
| C-1 | 1 | No use of a homogenizer | | 200 |
| C-2 | 2 | | | 200 |
| C-3 | 5 | | | 200 |
| C-4 | 5 | 2000 | 3 | 80 |
| C-5 | 5 | 3500 | 5 | 20 |
| C-6 | 10 | 3500 | 5 | 20 |
| C-7 | 20 | 3500 | 5 | 20 |

Evaluation of Physical Properties (1) Izod impact strength (units: kg·cm/cm)

The Izod impact strength of a ⅛ inch-thick specimen is measured under notched conditions by an evaluation method according to ASTM D256.

(2) Melt-flow index (MI) (units: g/10 min)

The melt-flow index (MI) is measured under conditions of a temperature of 220° C. and a load of 10 kg according to ASTM D1238.

(3) Vicat softening temperature (VST) (units: ° C.)

The Vicat softening temperature of a ¼ inch-thick specimen is measured under conditions of a load of 5 kgf and a rate of 50° C./hr by an evaluation method according to ISO 306B50.

(4) Surface gloss (units: %)

The surface gloss is measured at an angle of 60° by an evaluation method according to ASTM D523 using a BYK-Gardner gloss meter commercially available from BYK.

EXAMPLES 1 to 6 and COMPARATIVE EXAMPLES 1 to 3

Thermoplastic resin compositions are prepared using the compositional ratios of the components listed in the following Table 2, and then extruded to prepare thermoplastic resins in the form of a pellet. In this case, the extrusion is performed using a twin-screw extruder having an L/D ratio of 29 and a diameter of 45 mm, and the barrel temperature is set to 230° C. The prepared pellets are dried at 80° C. for 2 hours, and then molded in a 6 oz injection molding machine in which a cylinder temperature and a mold temperature are set to 240° C. and 60° C., respectively, to prepare physical property specimens and specimens (with a size of 9 cm×5 cm×0.2 cm) for evaluating physical properties. Physical properties of the prepared specimens are listed in Table 3.

TABLE 2

| | (A) Rubber-modified graft copolymer (% by weight) | (B) Aromatic vinyl-vinyl cyanide-based copolymer (% by weight) | (C) Silicone-modified aromatic vinyl-vinyl cyanide-based copolymer (% by weight) |
|---|---|---|---|
| Example 1 | 20 | 60 | C-4 (20) |
| Example 2 | 20 | 70 | C-4 (10) |
| Example 3 | 20 | 75 | C-4 (5) |
| Example 4 | 20 | 75 | C-5 (5) |
| Example 5 | 20 | 75 | C-6 (5) |
| Example 6 | 20 | 75 | C-7 (5) |
| Comparative Example 1 | 20 | 60 | C-1 (20) |
| Comparative Example 2 | 20 | 60 | C-2 (20) |
| Comparative Example 3 | 20 | 60 | C-3 (20) |

TABLE 3

| | Izod impact strength (kg·cm/cm) | Melt-flow index (MI; g/10 min) | Vicat softening temperature (VST; ° C.) | Gloss (%) |
|---|---|---|---|---|
| Example 1 | 16.2 | 7.5 | 101.2 | 50 |
| Example 2 | 16.0 | 13.2 | 101.3 | 57 |
| Example 3 | 16.3 | 13.7 | 101.5 | 65 |
| Example 4 | 15.9 | 12.9 | 101.4 | 60 |
| Example 5 | 13.6 | 14.0 | 101.7 | 48 |
| Example 6 | 11.1 | 14.4 | 101.5 | 30 |
| Comparative Example 1 | 19.4 | 7.9 | 101.5 | 80 |
| Comparative Example 2 | 17.3 | 7.0 | 101.1 | 42 |
| Comparative Example 3 | 17.4 | 8.6 | 101.6 | 72 |

As listed in Table 3, it can be seen that the specimens prepared in Examples 1 to 6 exemplifying the present invention have remarkably lower gloss values than the specimens prepared in Comparative Examples 1 to 3. Also, it can be seen that the melt-flow indexes (MI), as an item for fluidity, of the specimens of Examples 1 to 6 are up to two times higher than the specimens of Comparative Examples 1 to 3. It can be seen that the specimen of Comparative Example 2 has a gloss similar to that of the specimens of Examples 1 to 6, but has remarkably lower fluidity than the specimens of Examples 1 to 6. In particular, it can be seen that, as the average particle size of (C) the silicone-modified aromatic vinyl-vinyl cyanide-based copolymer decreases, the specimens exhibit excellent matting characteristics and fluidity even when a small amount of (C) the silicone-modified aromatic vinyl-vinyl cyanide-based copolymer is added.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. Therefore, the scope of the present invention is defined by the appended claims and equivalents thereof.

What is claimed is:

1. A thermoplastic resin composition comprising: (A) a rubber-modified graft copolymer, (B) an aromatic vinyl-vinyl cyanide-based copolymer, and (C) a silicone-modified aromatic vinyl-vinyl cyanide-based copolymer,
   wherein (C) the silicone-modified aromatic vinyl-vinyl cyanide-based copolymer has an average particle size of about 20 μm to about 100 μm,
   wherein a molded article comprising the thermoplastic resin composition has a melt-flow index of about 3 to about 30 g/10 min, as measured under conditions of a temperature of 220° C. and a load of 10 kg by an evaluation method according to ASTM D1238 and a gloss of about 70% or less, as measured at an angle of 60° by an evaluation method according to ASTM D523.

2. The thermoplastic resin composition of claim 1, wherein (C) the silicone-modified aromatic vinyl-vinyl cyanide-based copolymer is cross-linked.

3. The thermoplastic resin composition of claim 1, wherein (C) the silicone-modified aromatic vinyl-vinyl cyanide-based copolymer is a copolymer of a mixture of monomers comprising (C1) an aromatic vinyl-based monomer, (C2) an unsaturated nitrile-based monomer, and (C3) a cross-linkable monomer.

4. The thermoplastic resin composition of claim 3, wherein (C) the silicone-modified aromatic vinyl-vinyl cyanide-based copolymer is the copolymer of the mixture of monomers comprising:
   about 100 parts by weight of a mixture of monomers comprising (C1) the aromatic vinyl-based monomer in an amount of about 60 to about 80% by weight and (C2) the unsaturated nitrile-based monomer in an amount of about 20 to about 40% by weight; and
   about 0.1 to about 20 parts by weight of (C3) the cross-linkable monomer, based on about 100 parts by weight of the mixture of monomers comprising (C1) the aromatic vinyl-based monomer and (C2) the unsaturated nitrile-based monomer.

5. The thermoplastic resin composition of claim 3, wherein (C1) the aromatic vinyl-based monomer comprises styrene, α-methylstyrene, β-methylstyrene, p-methylstyrene, p-t-butyl styrene, ethyl styrene, vinylxylene, monochlorostyrene, di chl oro styrene, dibromostyrene, vinylnaphthalene, or a mixture thereof.

6. The thermoplastic resin composition of claim 3, wherein (C2) the unsaturated nitrile-based monomer comprises acrylonitrile, methacrylonitrile, ethacrylonitrile, phenylacrylonitrile, a-chloroacrylonitrile, fumaronitrile, or a mixture thereof.

7. The thermoplastic resin composition of claim 3, wherein (C3) the cross-linkable monomer comprises a compound or a mixture of compounds represented by the following Formula 1:

[Formula 1]

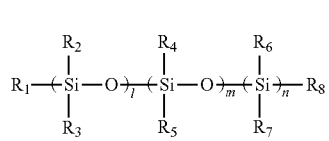

wherein l, m and n are the same or different and are each independently an integer ranging from 0 to 100, provided that l, m and n are not zero at the same time, and $R_1$, $R_2$, $R_3$, $R_4$, $R_5$, $R_6$, $R_7$, and $R_8$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, provided that at least two of $R_1$, $R_2$, $R_3$, $R_4$, $R_5$, $R_6$, $R_7$, and $R_8$ include a polymerizable unsaturated reactive group.

8. The thermoplastic resin composition of claim 3, wherein (C3) the cross-linkable monomer comprises a compound or a mixture of compounds represented by the following Formula 2:

[Formula 2]

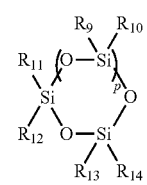

wherein $R_9$, $R_{10}$, $R_{11}$, $R_{12}$, $R_{13}$ and $R_{14}$ are the same or different and are each independently hydrogen, a substituted or unsubstituted $C_1$ to $C_{30}$ alkyl group, a substituted or unsubstituted $C_2$ to $C_{30}$ alkenyl group, a substituted or unsubstituted $C_2$ to $C_{30}$ alkynyl group, a substituted or unsubstituted $C_3$ to $C_{30}$ cycloalkyl group, a substituted or unsubstituted $C_6$ to $C_{30}$ aryl group, a substituted or unsubstituted $C_1$ to $C_{30}$ heteroaryl group, a hydroxyl group, an alkoxy group, an amino group, an epoxy group, a carboxyl group, a halogen group, an ester group, an isocyanate group, or a mercapto group, and
p is an integer ranging from 1 to 6, provided that at least two of $R_9$, $R_{10}$, $R_{11}$, $R_{12}$, $R_{13}$, and $R_{14}$ include a polymerizable unsaturated reactive group.

9. The thermoplastic resin composition of claim 3, wherein (C3) the cross-linkable monomer comprises 1,3,5-trimethyl-1,3,5-trivinyl-cyclotrisiloxane, 1,3,5,7-tetramethyl-1,3,5,7-tetravinyl-cyclotetrasiloxane, 1,3,5,7,9-pentamethyl-1,3,5,7,9-pentavinyl-cyclopentasiloxane, 1,3,5-triethyl-1,3,5-trivinyl-cyclotrisiloxane, 1,3,5,7-tetraethyl-1,3,5,7-tetravinyl-cyclotetrasiloxane, 1,3,5,7,9-pentaethyl-1,3,5,7,9-pentavinyl-cyclopentasiloxane, or a mixture thereof.

10. The thermoplastic resin composition of claim 1, wherein (C) the silicone-modified aromatic vinyl-vinyl cyanide-based copolymer has an average particle size of about 20 μm to about 80 μm.

11. The thermoplastic resin composition of claim 1, wherein the thermoplastic resin composition comprises (A) the rubber-modified graft copolymer in an amount of about 10 to about 40% by weight, (B) the aromatic vinyl-vinyl cyanide-based copolymer in an amount of about 20 to about 90% by weight, and (C) the silicone-modified aromatic vinyl-vinyl cyanide-based copolymer in an amount of about 1 to about 30% by weight.

12. A molded article comprising the thermoplastic resin composition of claim 1.

\* \* \* \* \*

UNITED STATES PATENT AND TRADEMARK OFFICE
CERTIFICATE OF CORRECTION

PATENT NO. : 9,856,371 B2  Page 1 of 1
APPLICATION NO. : 14/747176
DATED : January 2, 2018
INVENTOR(S) : Bo Eun Kim et al.

It is certified that error appears in the above-identified patent and that said Letters Patent is hereby corrected as shown below:

Page 3, Column 1, Line 74, under Foreign Patent Documents delete "NO 2008/081791 A1 7/2008" and insert:
--WO 2008/081791 A1 7/2008--

Signed and Sealed this
Nineteenth Day of June, 2018

Andrei Iancu
*Director of the United States Patent and Trademark Office*